United States Patent [19]

Anson

[11] Patent Number: 5,064,533
[45] Date of Patent: Nov. 12, 1991

[54] FUNNEL BASKET STRUCTURE

[75] Inventor: James H. Anson, Auburn, Ill.

[73] Assignee: Bunn-O-Matic Corporation, Springfield, Ill.

[21] Appl. No.: 545,475

[22] Filed: Jun. 28, 1990

[51] Int. Cl.$^5$ .......................................... B01D 29/085
[52] U.S. Cl. .................... 210/232; 210/474; 210/479; 210/481; 99/295
[58] Field of Search .......................... 426/77, 82, 433; 210/473, 474, 476, 477, 478, 479, 480, 481, 482, 232, 238; 99/295, 306, 323

[56] References Cited

U.S. PATENT DOCUMENTS

| | | | |
|---|---|---|---|
| 425,374 | 4/1890 | Elliott | 210/479 |
| 2,814,245 | 11/1957 | Courtney | 99/323 |
| 3,034,418 | 5/1962 | Bunn | 99/323 |
| 3,388,804 | 6/1968 | Hester | 210/479 |
| 3,511,166 | 5/1970 | Bixby, Jr. | 99/295 |
| 4,207,809 | 6/1980 | Brill | 99/306 |
| 4,739,697 | 4/1988 | Roberts | 99/295 |
| 4,765,896 | 8/1988 | Hartley et al. | 210/474 |

Primary Examiner—Robert A. Dawson
Assistant Examiner—Wanda L. Millard
Attorney, Agent, or Firm—Trexler, Bushnell, Giangiorgi & Blackstone, Ltd.

[57] ABSTRACT

A beverage brewing funnel including a filter retaining basket and a handle which are securely yet removably attached to a funnel shell. A compressible fork and a prong attached to an upper portion of the filter retaining basket engage a slot and an aperture, respectively, and a compressible annular bead engages a corresponding groove to retain the filter retaining basket inside of the funnel shell. A two member fastener attaches the handle to an outside surface of the funnel shell. A first member of the fastener is attached to the outside surface of the funnel shell and a second member of the fastener attaches the handle to the first member of the fastener. The filter retaining basket employs no loose hardware and the two member fastener used to attach the handle to the funnel shell is attached in on the outside of the funnel shell.

8 Claims, 2 Drawing Sheets

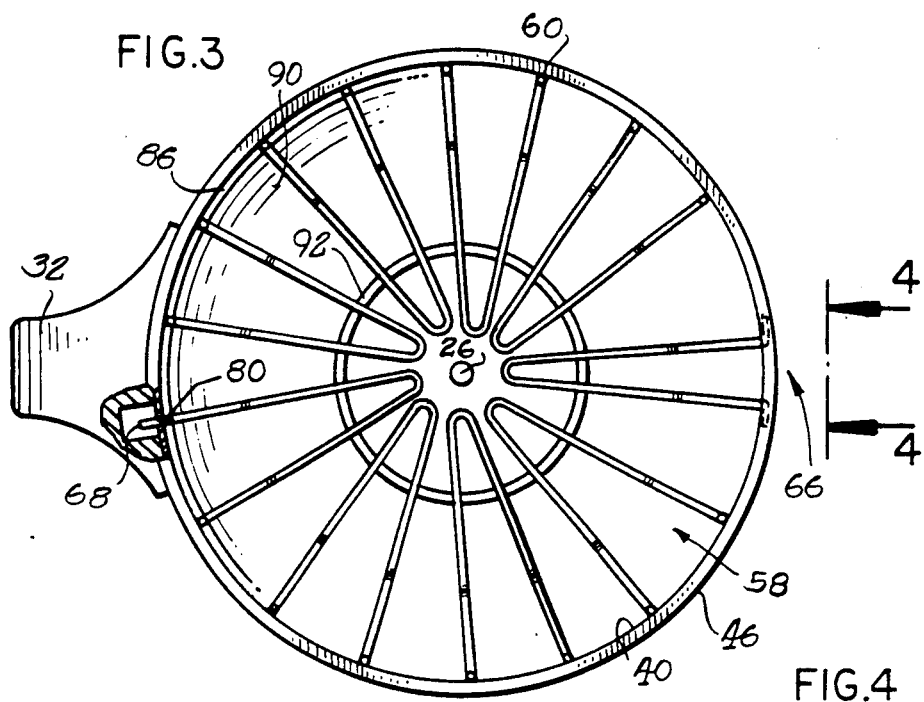
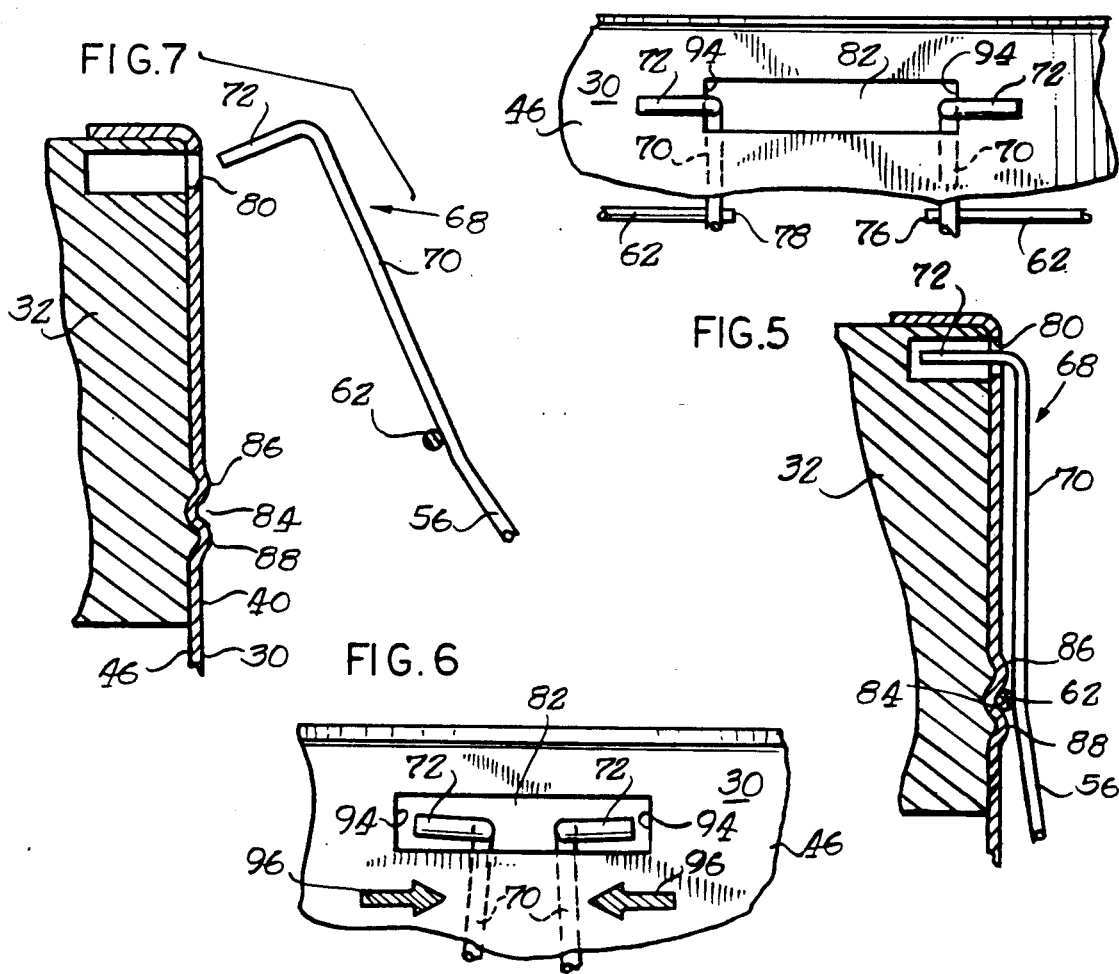

FUNNEL BASKET STRUCTURE

BACKGROUND OF THE INVENTION

This invention relates to a beverage brewing funnel for retaining a brewing filter and a charge of brewing substance for infusion with heated water to produce a brewed beverage.

Common beverage brewing funnels employ filter retaining baskets to separate a disposable brewing filter containing a charge of brewing substance disposed therein from internal walls of a funnel shell of the beverage brewing funnel. It is important to retain the brewing filter and brewing substance spaced away from the funnel shell walls to permit the brewed beverage to drain from the brewing filter and through an aperture formed in the bottom of the funnel shell. A handle attached to the outside of the funnel permits attachment to and removal from a beverage brewing machine. As is common in a commercial setting, large quantities of brewed beverage must be produced thereby necessitating a generally large funnel.

In commercial settings the large funnels necessitate secure attachment of the handle and the basket to the funnel shell. Typically when a filter containing a spent charge of beverage brewing substance is to be disposed, the funnel is removed from the beverage brewing machine and dumped into a disposal container The dumping process typically involves rapid and forceful impact with the side of the disposal container. Since a funnel encounters substantial stress and force when a spent filter is disposed it is essential that the handle and the basket be securely fastened to the funnel shell in order to avoid losing the basket in the disposal container or disengagement of the handle from the funnel shell.

While it is necessary to provide secure attachment of the handle and the basket to the funnel shell the National Sanitation Foundation imposes requirements upon commercial food preparers which prohibits loose, potentially loose, or removable fasteners in a food area. With regard to a beverage brewing funnel the food area includes the area inside of the funnel shell. Therefore it is clear that such fasteners may not be used to attach the handle and the basket to the funnel shell.

Further, it is necessary to remove the handle and basket for periodic cleaning and sanitation. Removable fasteners permitted the handle and basket to be removed rather easily yet do not satisfy the National Sanitation Foundation requirements. These requirements are considered important for healthful and safe food preparation to prevent the accidental inclusion of undesirable materials such as fasteners in a food product which is regulated by the National Sanitation Foundation requirements.

Since it is extremely important to satisfy the National Sanitation Foundation requirements in the preparation of brewed beverages, and these requirements prohibit the use of loose fasteners in a food area, it is extremely desirable to provide a beverage brewing funnel which securely yet removably retains the handle and basket on the funnel shell.

OBJECTS AND SUMMARY OF THE INVENTION

A general object of the present invention is to provide a beverage brewing funnel which securely yet removably retains a basket and a handle on a funnel shell without the aid of fasteners attached on the inside of the funnel shell.

Another object of the present invention is to provide a basket for use with a beverage brewing funnel which securely yet easily removably attaches to a funnel shell employing only captive retention devices.

Yet a further object of the present invention is to provide a beverage brewing funnel in which the securely yet removably attached handle and basket satisfy National Sanitation Foundation requirements.

Briefly, and in accordance with the foregoing, the present invention comprises a beverage brewing funnel including a filter retaining basket and a handle which are securely yet removably attached to a funnel shell. A compressible fork and a prong attached to an upper portion of the filter retaining basket engage a slot and an aperture, respectively, to retain the filter retaining basket inside of the funnel shell. A two member fastener attaches the handle to an outside surface of the funnel shell. A first member of the fastener is attached to the outside surface of the funnel shell and a second member of the fastener attaches the handle to the first member of the fastener. The basket employs no loose hardware and the two member fastener used to attach the handle to the funnel shell is attached on the outside of the funnel shell.

BRIEF DESCRIPTION OF THE DRAWINGS

The features of the present invention which are believed to be novel are set forth with particularity in the appended claims. The organization and manner of the operation of the invention, together with the objects and advantages thereof, may be understood best by reference to the following description taken in connection with the accompanying drawings wherein like reference numerals identify like elements in which:

FIG. 3 is a partial fragmentary plan view of the beverage brewing funnel in which a portion of a side wall of the funnel shell and the handle are removed to illustrate attachment of a prong formed on a top portion of the basket to an aperture formed in the side wall and the handle;

FIG. 4 is an enlarged partial fragmentary view taken along line 4—4 in FIG. 3 of a compressible fork formed on the top portion of the basket biasedly engaging a slot formed in the sidewall of the funnel shell;

FIG. 5 is a partial fragmentary side view of the prong formed on the top portion of the basket engaging an aperture formed through the sidewall of the funnel shell;

FIG. 6 is an enlarged partial fragmentary view of the compressible fork in a compressed state for removal from the slot;

FIG. 7 is an enlarged partial fragmentary view of the prong as it is removed from the aperture formed through the sidewall of the funnel shell.

DESCRIPTION OF THE ILLUSTRATED EMBODIMENT

Figure 1:
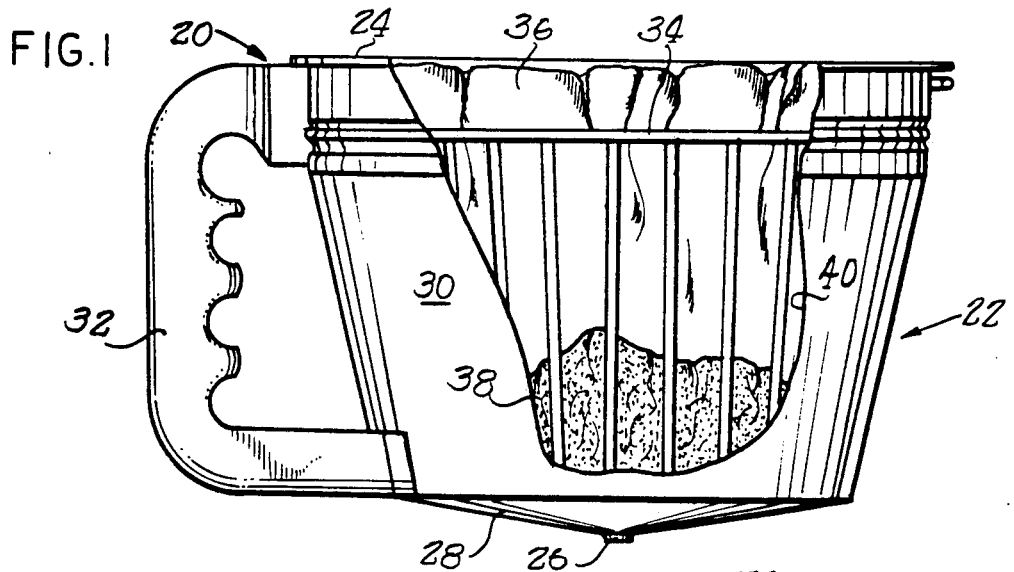
FIG. 1 is a partial fragmentary side view of a beverage brewing funnel in which a portion of a side wall of a funnel shell and a corresponding portion of a brewing filter disposed inside of the funnel shell have been removed.

While this invention may be susceptible to embodiment in different forms, there is shown in the drawings and will described herein in detail, a specific embodiment with the understanding that the present disclosure is to be considered an exemplification of the principles of the invention, and is not intended to limit the invention to that as illustrated.

Beverage brewing funnel means or funnel means 20, as illustrated in FIG. 1, is used in the brewing of beverages This type of funnel means 20 includes a funnel shell 22 having a generally frustoconical shape with a top opening 24 and a drain aperture 26 formed in a bottom surface 28 thereof. Sidewalls 30 extend generally continuously around the funnel shell 22 between the top opening 24 and the bottom surface 28.

As will be described in greater detail hereinbelow a handle 32 is attached to the sidewalls 30 of the funnel shell 22 to permit the funnel means 20 to be easily manipulated. As shown through the fragmented portion of the funnel portion 22 sidewalls 30, filter retaining basket means or basket means 34 is nestable inside of the funnel shell 22 for removably retaining a brewing filter 36. A charge of a beverage brewing substance 38 is placed inside of the filter 36 for infusion with heated water to produce a beverage. When a beverage brewing substance 38 is infused with water a resulting brewed beverage substance passes through the brewing filter 36 along an inside surface or food area 40 of the funnel shell 22 towards the bottom surface 28 which is dished towards the drain aperture 26 for collection in a decanter or other vessel placed therebelow.

Figure 2:
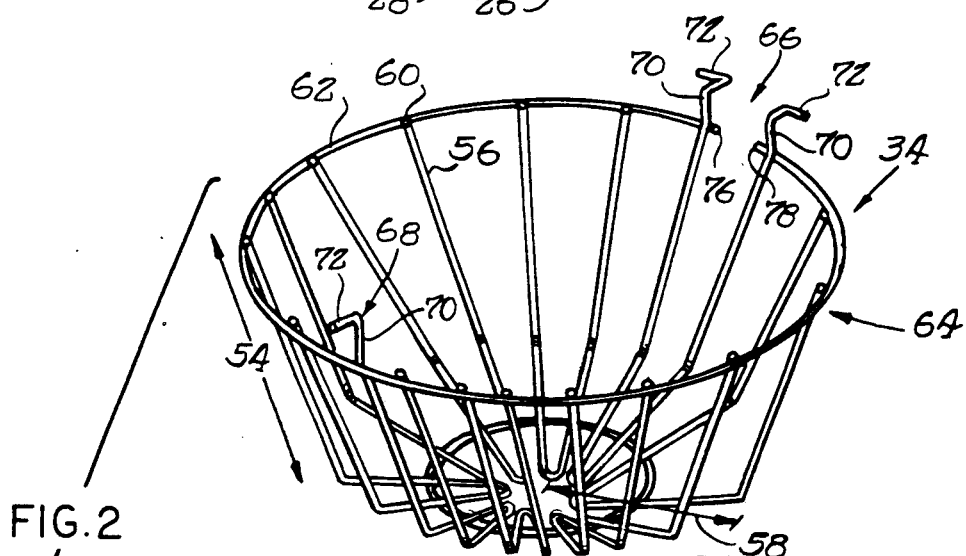
FIG. 2 is an exploded perspective view of the beverage brewing funnel as illustrated in FIG. 1 showing a basket nestable inside of the funnel shell and a handle attachable to the outside thereof.
Figure 2:
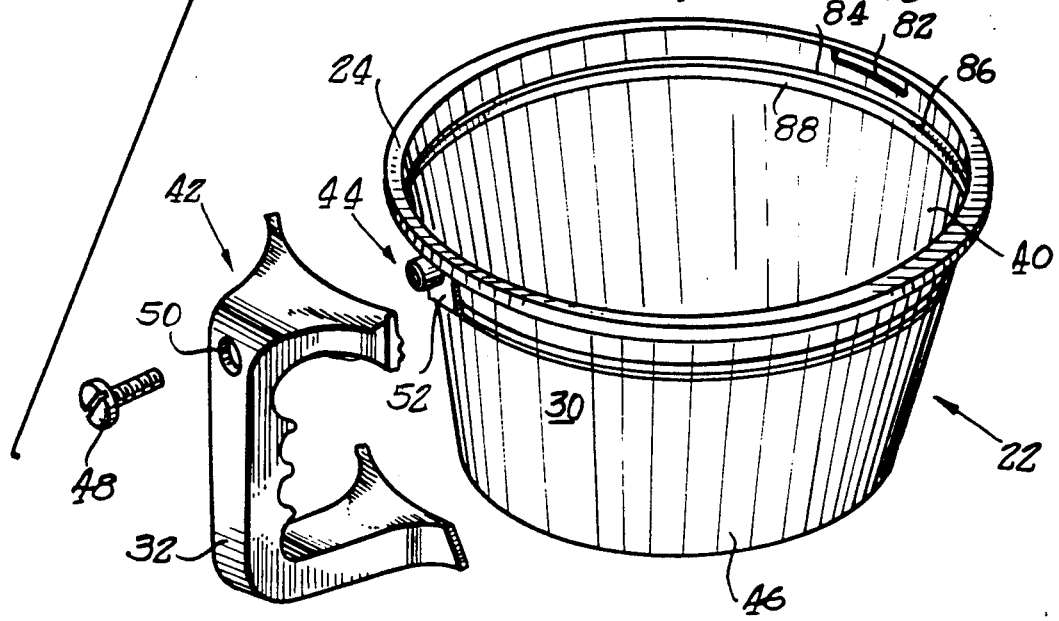

In FIG. 2 the funnel means 20 has been exploded to provide greater detail for reference to the elements thereof. As shown in FIG. 2, the handle 32 is removably attachable to the funnel shell 22 by means of attachment means 42 comprising a first member 44 attached to an outside surface 46 of the sidewalls 30 of the funnel shell 22 and a second member 48 engageable with the first member 44. The first member 44 is a fastener receiving member which is attached to the outside surface 46 by means of tack welding. The handle 32 is positioned over the first member 44 to permit the second member 48, in this case a threaded fastener, to be inserted through a fastener bore 50 appropriately formed through the handle 32. Since the first member 44 and second member 48 are both positioned and retained outside of the food area 40 of the funnel shell 22 the attachment means 42 satisfies the National Sanitation Foundation requirements for this type of beverage brewing device. Additionally, the first member 44 is formed with flange members 52 which extend outwardly from the first member 44 and are attached to the funnel shell 22 to provide additional structural support for attaching the handle 32 to the funnel shell 22. The flange members 52 provide the additional strength necessary to endure forceful blows against the side of a disposal container when a spent charge of beverage brewing substance and brewing filter 36 are to be disposed.

The basket means 34, as illustrated in FIG. 2, is formed with a skeleton-like frame formed to retain the brewing filter 36 spaced away from the inside surface 40 of the funnel shell 22 to promote passage of brewed beverage substances therethrough. The basket means 34 is formed with an upper portion 54 formed of generally vertical spaced apart ribs 56 and a base portion 58. The terminal ends of the ribs 56 or rib tips 60 generally perpendicularly attach to a non-continuous compressible annular bead 62.

Captive basket retention means 64 are formed on the upper portion 54 of the basket means 34 for removably engaging the funnel shell 22 to retain the basket means 34 inside of the funnel shell 22. It is important to note that the captive basket retention means 64 are permanently affixed to the basket means 34 to satisfy the National Sanitation foundation requirements prohibiting loose or removable hardware within the food area 40. Further, the captive basket retention means 64 must be capable of withstanding the stresses and forces imposed thereon during regular use.

As shown in FIG. 2, the captive basket retention means 64 includes a compressible fork 66, a prong 68 and the compressible annular bead 62. The compressible fork 66 and the prong 68 are respectively formed by extending ribs 56 beyond the compressible annular bead 62 and forming arms 70 and tines 72 on the ends thereof. The prong 68 is attached to the compressible annular bead 62 generally opposite the compressible fork 66. A first end 76 and a second end 78 are formed on the ends of the non-continuous compressible annular bead. Each arm 70 of the compressible fork 66 is attached to one of the first end 76 and the second end 78 of the compressible annular bead 62. Thus attached to the compressible annular bead 62, the arms 70 of the compressible fork 66 are biased apart by the compressible annular bead 62.

The basket means 34 nestably inserts into the funnel shell 22 with the prong 66 retainably engaged in a prong hole 80 and the compressible fork 66 biasedly engaged in a slot 82. When the basket means 34 is nested inside of the funnel shell 22, the compressible annular bead 62 engages an annular groove 84 cooperatively formed along the inside surface 40 of the funnel shell 22. The annular groove 84 includes an upper ridge 86 and a lower ridge 88 between which the compressible annular bead 62 is retained by biasing forces exerted outwardly against the inside surface 40 of the funnel shell 22 between the upper and lower ridge 86, 88.

As shown in the plan view of the funnel means 20 shown in FIG. 3, the compressible fork 66 is engaged in the slot 82 and the prong 68 is engaged in the prong hole 80. When the compressible annular bead 62 is engaged with the annular groove 84 it is not visible in the plan view as it is concealed behind the upper ridge 86. The ribs 56 extend along the base portion of the basket 58 forming wedge shaped members 90 extending radially towards the drain aperture 26 formed in the bottom surface 28 of the funnel shell 22. A retention ring 92 is attached to the wedge shaped members 90 spaced between the drain aperture 26 and the compressible annular bead 62 to provide additional structural support for the basket means 34.

As shown in FIG. 4, the slot 82 is a generally rectangularly shaped opening formed through the sidewall 30 funnel shell 22. The tines 72 of the compressible fork 66 extend through the slot 82 and biasedly engage outer edges 94 of the slot 82 under the influence of the outwardly biasing forces imposed thereon by connection at the arms 70 of the compressible annular bead 62. As shown in FIG. 5, the tine 72 formed on the end of the arm 70 of the prong 68 extends into the prong hole 80 through the funnel shell 22 and extends into a corresponding continuation of the prong hole 80 formed in the handle 32. Further, as shown in cross-section in FIG. 5, the compressible annular bead 62 securely engages the annular groove 84 formed between the upper and lower ridges 86, 88. The annular bead 62 thus helps to maintain the vertical position of the basket means 34 relative to the inside surface 40 of the funnel shell 22 in cooperation with the compressible fork 66 engaged with the slot 82 and the prong 68 engaged in the prong hole 80.

To remove the basket means 34 from the funnel shell 22 the compressible fork 66 is compressed as shown in FIG. 6. Compression forces (as indicated by arrows 96) are exerted on the arms 70 of the compressible fork 66 pressing the arms 70 towards each other. As compression forces 96 are exerted on the arms 70 of the compressible fork 66 the tines 72 formed on the ends thereof disengage the respective outer edges 94 of the slot 82. Once ends 98 of the tines 72 clear the outer edges 94 the compressible annular bead 62 is sufficiently compressed to permit removal of the annular bead 62 from the annular groove 84 by pivoting the basket means 34 upwardly out of the funnel shell 22 about the prong 68. Rotation of the basket means 34 about the prong 68 is better illustrated in FIG. 7. As shown in FIG. 7, the basket means 34 have been rotated upwardly to a position where the prong 68 is disengaged from the prong hole 80 so that the basket means 34 may be lifted out of the funnel shell 22.

Removed as such, the inside surface 40 of the funnel shell 22 may be cleaned without obstruction by the basket means 34. After the funnel shell 22 has been satisfactorily cleaned, the basket means 34 is returned to engagement inside of the funnel shell 22. Engagement of the basket means 34 with a funnel shell 22 is accomplished by inserting the prong 68 into the prong hole 80 and pivoting the basket means 34 downwardly into the funnel shell 22. Once the basket means 34 is nested into the funnel shell 22 to a position where the annular bead 62 generally rests on top of the upper ridge 86, the compressible fork 66 is compressed to compress the annular bead 62, the ends 76, 78 of which are attached to the compressible fork 66, for engagement with the annular groove 84. Once sufficiently compressed, the tines 72 of the compressible fork 66 are pushed through the slot 82 after which the compressive forces 96 are released so that the tines 72 engage the outer edges 94 of the slot 82.

While a preferred embodiment of the present invention is shown and described it is envisioned that those skilled in the art may devise modifications of the present invention without departing from the spirit and scope of the appended claims.

The invention is claimed as follows:

1. Beverage brewing funnel means having an externally attached handle member for retaining a brewing filter and a beverage brewing substance for infusion with heated water to produce a brewed beverage, said beverage brewing funnel means comprising: a funnel shell formed with a top opening, a drain aperture formed in a bottom surface thereof, and generally continuous sidewalls; attachment means for externally attaching said handle to said funnel shell, said attachment means comprising a first member attached to one of an outside surface of said sidewall of said funnel shell and said handle member, and a second member engageable with the other of said outside surface of said sidewall of said funnel shell and said handle member, said first and second members being engageable for removably attaching said handle to said funnel shell; a filter retaining basket including a skeleton-like frame and captive basket retention means attached to an upper portion of said skeleton-like frame for removably attaching said filter retaining basket to an inside of said funnel shell, said captive basket retention means comprising a compressible fork biasedly engageable with a slot formed in an upper portion of said funnel shell, a protruding prong member formed on an upper portion of said skeleton-like frame and spaced apart from said compressible fork and engageable with an aperture cooperatively formed in said funnel shell, and a compressible annular bead formed on an upper portion of said skeleton-like frame and biasedly engageable with an annular groove cooperatively formed on an upper portion of said funnel shell.

2. Beverage brewing funnel means according to claim 1 wherein in a first member is attached to said funnel shell, said first member being formed with flange members extending away from said first member and attached to said funnel shell for providing additional structural support for attaching said handle to said funnel shell.

3. Beverage brewing funnel means according to claim 2, wherein said first member is a threaded weld nut and said second member is a cooperatively threaded fastener captively retained on said handle and threadably engageable with said first member.

4. Beverage brewing funnel means for retaining a brewing filter and a charge of brewing substance for infusion with heated water to produce a brewed beverage; said beverage brewing funnel means comprising a funnel shell, a handle removably attached to said funnel shell, and basket means nestable inside of said funnel shell for removably retaining said brewing filter spaced away from said funnel shell; said funnel shell being formed with a top opening through which said filter and brewing substance are disposed, a drain aperture formed in a bottom surface thereof, and generally continuous side walls; attachment means attached to said funnel shell and said handle for removably attaching said handle to said funnel shell without protruding into said funnel shell; said basket means comprising a generally skeleton-like frame formed to retain a brewing filter spaced away from said funnel shell sidewalls and to promote passage of brewed beverage therethrough; captive basket retention means formed on an upper portion of said basket for removably engaging said funnel shell to removably retain said basket means in said funnel shell, said captive basket retention means including a compressible fork and a prong formed on an upper portion of said skeleton-like frame and said funnel shell is formed with a slot for receiving said compressible fork and an aperture for receiving said prong.

5. Beverage brewing funnel means according to claim 4, wherein said captive basket retention means further include a compressible annular bead formed on an upper portion of said skeleton-like frame for biasedly engaging an annular groove cooperatively formed on an internal surface of said funnel shell.

6. Beverage brewing funnel means for retaining a brewing filter and a charge of brewing substance for infusion with heated water to produce a brewed beverage; said beverage brewing funnel means comprising a funnel shell, a handle removably attached to said funnel shell, and basket means nestable inside of said funnel shell for removably retaining said brewing filter spaced away from said funnel shell; said funnel shell being formed with a top opening through which said filter and brewing substance are disposed, a drain aperture formed in a bottom surface thereof, and generally continuous side walls; attachment means attached to said funnel shell and said handle for removably attaching said handle to said funnel shell without protruding into said funnel shell; said basket means comprising a generally skeleton-like frame formed to retain a brewing filter spaced away from said funnel shell sidewalls and to promote passage of brewed beverage therethrough; captive basket retention means formed on an upper portion of said basket for removably engaging said funnel shell to removably retain said basket means in said funnel shell, said captive basket retention means including two compressible spaced apart prongs on said upper portion of said basket means selectively engageable with a slot formed through said funnel shell for retaining said basket means in said funnel shell when said funnel means is inverted.

7. A filter retaining basket for use with a beverage brewing funnel shell, said basket comprising a skeleton-like frame and captive basket retention means integrally formed on an upper portion of said basket-like frame for removably engaging said funnel shell to removably retain said basket in said funnel shell; said captive basket retention means comprising a compressible fork for biasedly engaging said funnel shell, two fork prong members formed on ends of said compressible fork on said upper portion of said basket-like frame for engaging a cooperatively formed slot in said funnel shell, and a third prong member spaced apart from said two fork prong members for engaging a cooperative aperture formed through said funnel shell.

8. Beverage brewing funnel means for retaining a brewing filter and a charge of brewing substance for infusion with heated water to produce a brewed beverage; said beverage brewing funnel means comprising a funnel shell, a handle removably attached to said funnel shell, and basket means nestable inside of said funnel shell for removably retaining said brewing filter spaced away from said funnel shell; said funnel shell being formed with a top opening through which said filter and brewing substance are disposed, a drain aperture formed in a bottom surface thereof, and generally continuous side walls; attachment means attached to said funnel shell and said handle for removably attaching said handle to said funnel shell without protruding into said funnel shell; said basket means comprising a generally skeleton-like frame formed to retain a brewing filter spaced away from said funnel shell sidewalls and to promote passage of brewed beverage therethrough; captive basket retention means formed on an upper portion of said basket for removably engaging said funnel shell to removably retain said basket means in said funnel shell, said captive basket retention means including a compressible fork, a prong spaced apart from said fork, and a non-continuous compressible annular bead formed on an upper portion of said skeleton-like frame; said funnel shell being formed with a slot for engageably receiving said compressible fork, an aperture for engageably receiving said prong and a groove formed on an inside surface of said sidewalls for retainably receiving said compressible bead; said upper portion of said skeleton-like frame being formed of generally vertical ribs, upper ends of said vertical ribs generally perpendicularly attached to said non-continuous compressible annular bead, said non-continuous compressible annular bead having a first and a second end, each of said first and second ends attached to one arm of said compressible fork and said arms of said compressible fork being compressible towards each other.

* * * * *